United States Patent [19]
Purro

[11] Patent Number: 5,023,652
[45] Date of Patent: Jun. 11, 1991

[54] METHOD AND APPARATUS FOR PHOTOGRAPHIC PRINTING

[76] Inventor: Norina M. Purro, 156 George Pl., Oceanside, N.Y. 11572

[21] Appl. No.: 378,398

[22] Filed: Jul. 11, 1989

[51] Int. Cl.$^5$ ............................................ G03B 27/00
[52] U.S. Cl. .................................... 355/1; 355/68; 355/80; 355/81
[58] Field of Search .................... 355/1, 38, 68, 80, 81

[56] References Cited

U.S. PATENT DOCUMENTS

| | | | |
|---|---|---|---|
| 3,163,080 | 12/1964 | Miller | 355/1 |
| 3,479,119 | 11/1969 | Miller et al. | 355/80 |
| 4,367,946 | 1/1983 | Varner | 355/1 |
| 4,675,702 | 6/1987 | Gerber | 355/53 |
| 4,774,549 | 9/1988 | Morse | 355/68 |
| 4,830,468 | 5/1989 | Stephany et al. | 355/80 |

FOREIGN PATENT DOCUMENTS

| | | | |
|---|---|---|---|
| 3321346 | 12/1984 | Fed. Rep. of Germany | 355/1 |
| 3435425 | 4/1986 | Fed. Rep. of Germany | 355/1 |

*Primary Examiner*—Monroe H. Hayes
*Attorney, Agent, or Firm*—Darby & Darby

[57] ABSTRACT

A photographic printing enlarger apparatus and method in which the enlarger head receives lights passing through a fiber optic light bundle. This light passes through a color filter system, negative, or transparency, supported by a negative carrier, and the lens. The beam of light projects the image on the surface of an exposure correction easel. A mechanical arm scans the beam of light passing through the negative in small sections, and senses the density of the negative, registering the information into a computer memory. The mechanical arm is driven to expose the light-sensitive photographic material in small sections in cooperation with a shutter system and in accordance with the information stored in computer memory. The mechanical arm is comprised of a row of several image sensors which read the wavelength of light passing through.

17 Claims, 3 Drawing Sheets

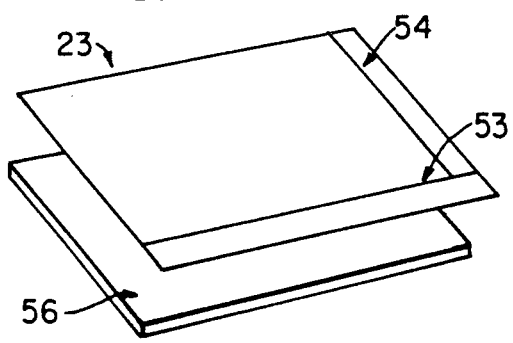
FIG. 4
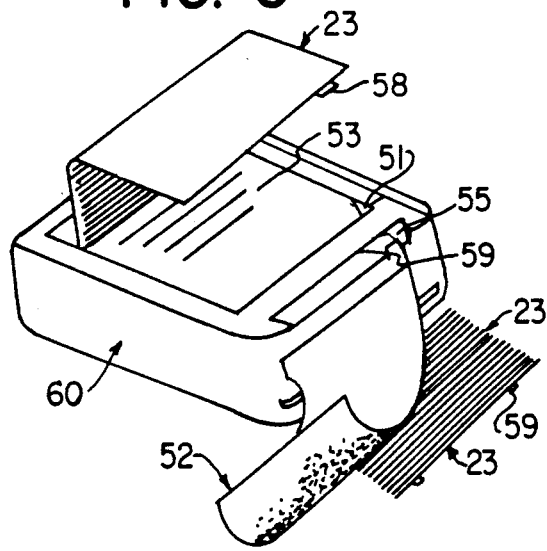
FIG. 5
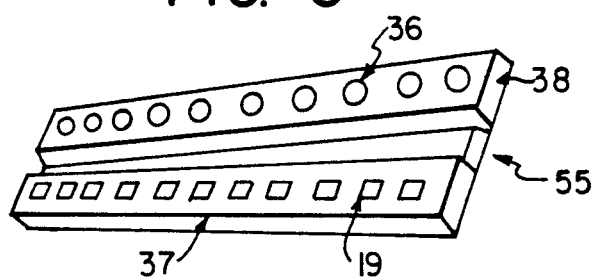
FIG. 6
FIG. 7
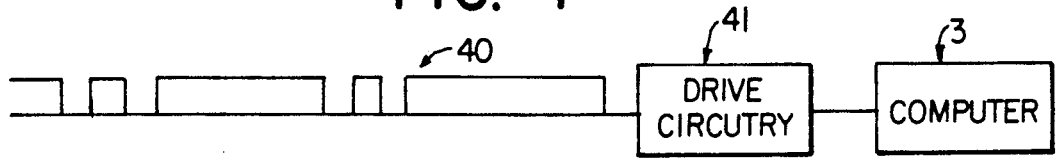
FIG. 8
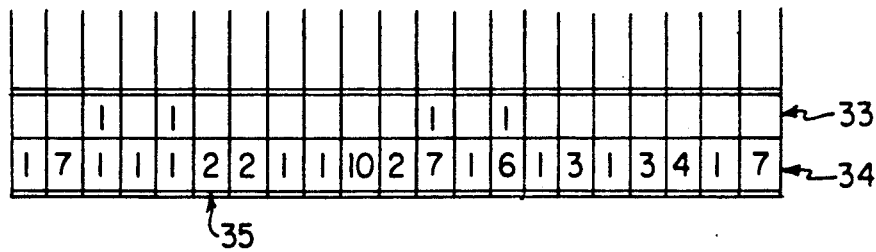

METHOD AND APPARATUS FOR PHOTOGRAPHIC PRINTING

BACKGROUND OF THE INVENTION

The present invention relates to photographic printing involving the exposure of light-sensitive materials to light passing through negatives or transparencies. Adjustment is made with respect to the density and/or color variations of the negatives or transparencies.

Negatives and transparencies can suffer from "color subject failure" in which some areas are under exposed and other areas are over exposed on the negative or transparency. Printing from such negatives or transparencies is a problem because the print will also have corresponding under exposed and over exposed areas unless steps are taken to compensate for such varying degrees of exposure.

For example, consider a negative for the sky, a lake, a wooded area and a dirt road. Assume the sky and lake are light blue and overexposed, the wooded area has a normal exposure and the dirt road is under exposed.

If a darkroom technician attempts to keep color and detail in the sky and lake in exposing a print from the negative, the dirt road will be black with no detail. If the print is exposed instead to show the detail in the road, the sky and lake will be washed out.

In practice, darkroom technicians compromise by averaging the exposure and shooting for the middle, but this method does not work very well. Burning and dodging the beam of light manually is another method used, but this method is inconsistent and dependent upon the skill of the technician in custom printing. Unfortunately, such techniques do not provide the control necessary for obtaining prints with a "near unity density coefficient" in which the print appears to have a consistent normal exposure throughout.

It would therefore be desireable to print from a negative or transparency so as to enable compensation for varying degrees of over exposure and under exposure in the negative or transparency.

SUMMARY OF THE INVENTION

One aspect of the present invention is directed at an apparatus and method for exposing light sensitive materials that includes light guides, a shutter and a light emitter. The light emitter emits light along a path through a light transmissible element, such as a negative or color transparency, to light-sensitive materials. The light guides are located in the path. The shutter selectively and individually closes so as to block the exposure of the light-sensitive materials from each of the light guides.

Correction of the exposure of the image throughout may be effected by compensating the negative or transparency for density variations so as to obtain a near unity density coefficient and by dividing the negative or transparency into segments so as to expose each segment separately at different time exposures, e.g. by employing fiber optics.

Blurring of the photographic image otherwise caused by vibration or movement of the base or ground during a lengthy exposure time may be reduced by shortening the required exposure time for dense negatives or transparencies. This shortening of the required exposure time is possible by using light guides, such as fiber optics, in an enlarger head to provide control of the amount of light used.

Flicker-free high-intensity cool light may be provided so that the film will not damage or buckle from heat as it does with a direct exposure from conventional enlarger light sources. Such cool light may be obtained by interposing fiber optics below a light source and the film. A heat-absorbing glass can be eliminated from the enlarger when using fiber optics. A white quartz halogen light may be used for picking up color and detail which are not evident from a conventional enlarger light source. Density of an image and a masking system is evaluated to provide proper exposure.

For a better understanding of the present invention, reference is made to the following description and accompanying drawings, while the scope of the invention is set forth in the appended claims.

BRIEF DESCRIPTION OF THE DRAWINGS

FIG. 4 is a perspective view of the easel of FIG. 2.

FIG. 5 is a perspective view of the easel and board of FIGS. 2-4 enclosed in a casing.

FIG. 6 is a perspective view of the mechanical arm of FIGS. 4 and 5.

FIG. 7 is a schematic representation of a shutter with drive circuitry.

FIG. 8 is a density chart.

DESCRIPTION OF THE PREFERRED EMBODIMENTS

Figure 1:
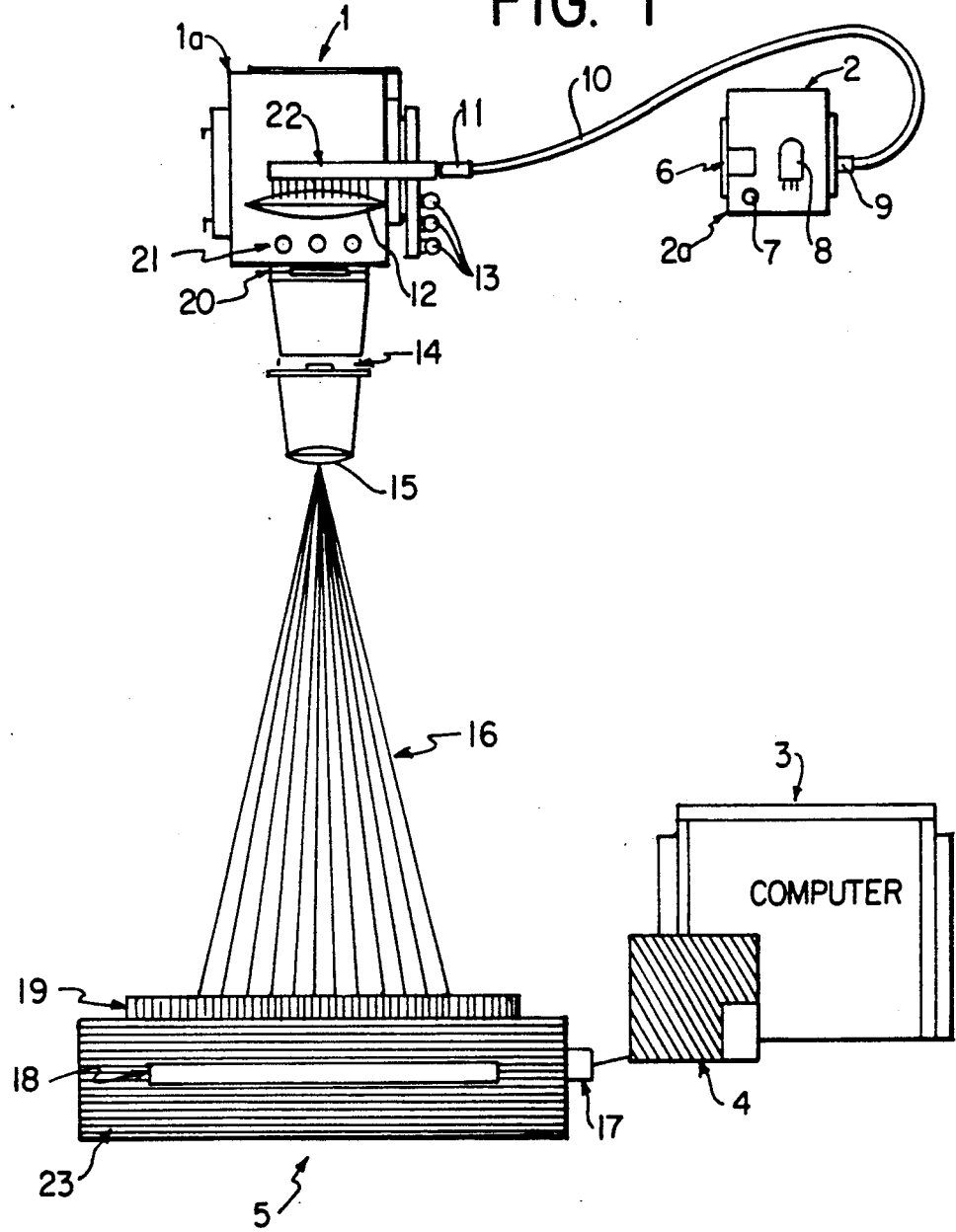
FIG. 1 is a schematic elevational view of an enlarger apparatus in accordance with the present invention.
Figure 2:
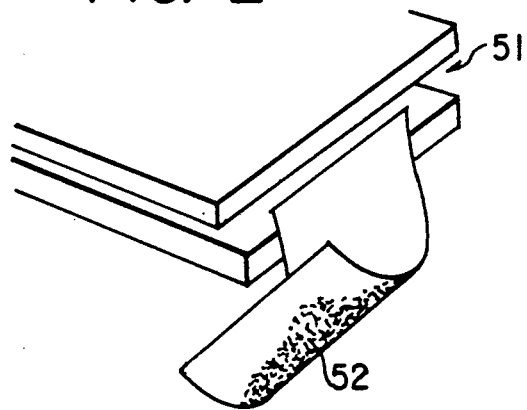
FIG. 2 is a partial perspective view of an easel shown in FIG. 1.

FIG. 1 shows six main components of an enlarger apparatus in accordance with the present invention: an enlarger head 1, a light source 2, a computer 3, a keyboard/sketch pad 4, an exposure correction easel 5 and a mechanical arm with fiber optic bundles 19.

The light source 2 includes a housing 2a which houses a quartz halogen light bulb 8 for emitting light, a rheostat 7 for adjusting the intensity of the light as desired and a cooling fan 6 for creating an air flow to cool the light bulb 8. The enlarger head 1 includes a housing 1a, condensers 12, color filters 20, a negative or transparency 14, and a focusing lens 15.

The housing 2a has an opening at which is releasably engaged an adapter 9. The enlarger head also has an opening at which is releasably engaged an adapter 11. A fiber optic cable 10 runs between and is held by the two adapters. A fiber optic bundle 22 of the cable 10 extends from the adapter 11 over standard condensers 12 for condensing light.

Light from the light source 8 is conveyed through the fiber optic cable 10 and out the fiber optic bundle 22 to the condensers 12. After passing through the condensers 12, the light passes through color filters 20 and then the negative or transparency 14. Thereafter, the light leaves the enlarger head 1 through the lens 15, forming a light beam 16.

The relative distance between the lens 15, condensers 12 and other internal components of the enlarger head through which light passes can be adjusted by turning standard focus and enlarger adjustment control knobs 13. Standard color adjustment control knobs 21 are turned for moving filters relative to each other so as to make color adjustments.

The light beam 16 strikes the exposure correction easel 5, but only the light rays which are allowed to pass through fiber optic bundles 19 in the mechanical arm 55 (see FIG. 6) actually enter into the exposure correction easel 5 to expose light or photo-sensitive materials contained therein. This is due to the presence of light-tight slats 23 which move with the mechanical arm and block external light.

Before allowing any of the light to expose the photosensitive materials, the density or color variations in the negative or transparencies are evaluated. Evaluation is made either with the naked eye or by image sensors (see FIG. 6). During this evaluation process, the light is blocked by a shutter masking system above fiber optic bundles 19. This masking system can either be mechanical or electronic.

The mechanical masking system is similar to a shutter in a camera and made of plastic or metal materials. This would involve moving parts and has inherent speed restrictions common to mechanical devices.

The electronic masking system involves the use of electromagnetic materials or liquid crystal displays. A liquid crystal display in the form of a dot matrix gives more flexibility and speed than mechanical shutter devices. Liquid crystals do not generate light but only scatter light falling or passing through them. Light passing through liquid crystal from different angles experience different degrees of refraction or bending of light rays. The molecules of liquid crystal possess dipole axes which are at 90° to the main axes of the molecules. When voltage is applied it turns the molecules so the dipole axes are brought into line with the electrical field and thereby polarizes light. Liquid crystal display elements can be activated into dot matrix form.

The mechanical arm is driven in accordance with control signals from the computer 3. The keyboard/electronic sketch pad 4 permits a user to vary sensed data or enter new data to control the exposure time through each of the fiber optic bundles 19. For instance, a mouse can be used on the electronic sketch pad.

Instead of sensing density with sensors in the arm, one could evaluate density with the naked eye and enter it into the computer. The exposure time of said small sections of the image is adjusted by keying in these areas on the computer keyboard, or with a light pen on a computer screen.

To correct the photographic image on light sensitive material, fiber optics are employed which also contain the masking system to randomly scan in exactly the same pattern as the CCD array. The fiber optics emit light when struck by the beam above, and if the beam density is controlled by the exposure signal from the computer, a reproduction of the original image is corrected on the photosensitive material. In order to obtain a satisfactory image on the photosensitive material, the masking system should be exactly at the same point line as the image sensors.

After defining the density of the image in small sections, the information is stored into the computer memory. Defining this information, the computer will feed back the signals to the shutter system on the mechanical arm. The shutters work simultaneously with the fiber optic light bundle 19 also in the mechanical arm to expose the small areas of the image that requires more or less time.

Figure 3:
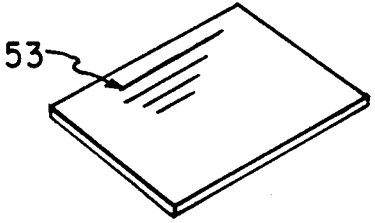
FIG. 3 is a perspective view of a board slotted for receiving different sized photosensitive paper inside the easel of FIG. 2.

The fiber optics and shutter system in the mechanical arm scans the photosensitive materials and exposes small sections of the image in accordance to the feedback information from the computer which has made density corrections (see FIG. 3). The shutters open and close at different intervals when signaled by the computer memory, blocking light or emitting light drawn from the light path of said fiber optic bundle 22 in the enlarger head. This light passes through a color filter system, and negative or transparency, supported by a negative carrier.

This beam of light projects the image onto the mechanical arm. The shutter system opens and closes and randomly exposes the photosensitive material through the fiber optic bundle 22 in the arm. Slats, which move with the arm, block light to prevent the photosensitive material from becoming exposed to more light than is allowed to pass through the mechanical arm at any one time.

To summarize, the enlarger has the negative or transparency and color filter in place. Fiber optic light bundle 19 is turned on. An image is projected onto the exposure correction easel. An arm moves to scan the image and feed density information into the computer memory. The arm returns to the bottom of the image. The arm is moved again in accordance with the information stored in the computer memory. The light beam going through the negative onto the exposure correction easel feeds light to the fiber optic bundle "B" in the arm. The shutters open and close when signaled by the computer and expose each small section of the image for the time required. The arm continues to move to expose the photosensitive material by exposing one row at a time in accordance with the stored information. The slats move with the arm.

This procedure achieves a near unity density coefficient, thereby providing a method of evaluating the density of the image and exposing the photosensitive material randomly in small sections at different time exposures using fiber optic bundles.

FIGS. 2-5 show the exposure correction easel 5 of FIG. 1 in greater detail. The easel 5 includes a light tight drawer 51 covering photosensitive material 52, which is held by an approximately sized slot 53 inside the easel 5. The drawer has a slit in which is fitted the mechanical arm 55 carrying fiber optic bundles 19 and is movable with respect to the photosensitive material 52 so as to expose the photosensitive materials to light passing through the fiber optic bundles. Movement of the drawer takes place in discrete segments over the entire area of the photosensitive materials and is driven by a motor controlled by the computer.

The light-tight drawer may hold a sheet of photosensitive material up to 16"×20". The bottom of the drawer will have slots 18 to precisely register the photosensitive material. The slots will accommodate all standard sizes, i.e., 5"×7", 8"×10", 11"×14", 16"×20", etc.

Above the light-tight drawer is the mechanical arm, or an xy Table with stepper motors. The movement of the arm is actuated electronically and the sequence of operation is stored in the computer 3. The mechanical arm 55 is mounted horizontally in a support which can slide up and down on a shaft. The arm 55 moves from line to line. The speed of the device depends on how the unit is controlled. The arm preferably is supported so that it is absolutely free of vibration effects. Such supports are known in other fields, e.g., for vibration-free printers.

Horizontally, around the easel 5 and attached to the mechanical arm 55 is a light-tight covering of plastic slats 23 which move in sequence with the movement of the mechanical arm. These slats 23 are attached to the mechanical arm 55 with clips 58,59 and can be detached from the arm on both sides as illustrated in FIG. 5. Detaching clips 58 above the arm 55 provides access for focusing adjustment. Detaching clips 59 below the arm 55 provides access for adding or removing of photosensitive material. The slats 23 move similar to slats in a roll top desk.

Designed in plastic or metal, the slats overlap each other in a tongue and grove effect to assure light tightness. Hence, the photosensitive material can be placed in the easel, focused, and removed. Standard methods of focusing are used. The slats 23 are designed to move horizontally around and under the easel as shown in FIG. 5. There is a plastic encasement 60 around the easel 5 to protect the slats 23 and to visually enhance the easel 5.

FIG. 6 shows the mechanical arm 55 of FIGS. 4 and 5 in greater detail. The mechanical arm 55 has a row 37 of fiber optic bundles 19 and an array 36 of image sensors 38, e.g., charge coupled devices (CCD), which read the wavelength of the light passing through the negative or transparency 14 of FIG. 1. It can read the density of black, white or gray tones.

The same type of masking system as used over the fiber optic bundles 19 may be applied to the CCD array to eliminate light when exposing the photosensitive material. The precision of movement is achieved by the use of synchronizing contact signals from the computer 3 for controlling the masking systems.

The CCD array senses a quantitative measure of light intensity and can read a small section of light. Texas Instrument manufactures CCD cells which are 10.4 mm (CZ104). Hundreds of thousands of cells cover a linear inch of space. These CCD arrays are carefully manufactured so that they can give as near constant reading as possible. Other companies may manufacture smaller cells. The smaller the cell the better the resolution. A 2-dimensional CCD array, approximately a 1" square piece, consisting of several increments reading approximately 1" sections at a time, can be an alternative to a CCD linear array.

Several thousand small sections are needed to give definition. At normal viewing distances, individual sections are too small to be seen. The technique of dividing an image into very small elements is used in other technologies, e.g. for laser scanning techniques.

The CCD array senses or reads the density of the various degrees of black, white and gray light emitted from the negative or transparency. The illumination of the image consists of various degrees of density which represents the way in which the exposure varies along the small sections of the optical image.

In a normal detailed image the density is different for almost each section and the exposure varies with each section almost all the time. The small sections are read simultaneously in accordance to density, one row at a time, to locate the required density beneath a single light source and can give as near constant reading as possible.

The CCD array reads small sections of constant tones and links small sections of equal density. The CCD array reads all sections on the scanning line of equal value and this information is stored into computer memory. It continues to read all sections of the next value, and so on. It analyses the density of all small sections on the line, from thickest to thinnest density, or vice versa, until all sections of the line are read. Thereafter, the computer 3 controls the mechanical arm 55 to move to the next line and the process is continued to record the density variation of this next line. The arm is moved horizontally across the illuminated image, from bottom to top, and scans each line and continues in this manner until the top of the image is reached. The arm is moved in predetermined increments so that the scanning is interrupted for a brief interval every time the mechanical moves to the next line of the image. The arm stops at the top of the image. When the reading is complete, the arm returns to the bottom of the easel. The CCD array is masked to block out all light generated from the enlarger head.

FIG. 7 is a schematic representation showing a shutter 40 driven by drive circuitry 41 that is controlled by the computer 3. The shutter 40 is shown as a row with preselected elements shaded and unshaded. The shaded elements represent a "closed" position blocking light. The unshaded elements represent an "open" position allowing light to pass. This shutter rests on top of the row 37 of fiber optic bundles 19 in registry therewith. Thus, closing or activating any one shutter element will block light from passing to the fiber optic bundle directly underneath. The shutter elements therefore cover the optic bundle open ends.

For an electronic shutter, LCDs are used as its shutter elements. For example, the LCDs may be of the passive transmissive type which normally allow light to pass unless activated in response to the drive circuitry 41, i.e. LCD drive circuitry. The LCD drive circuitry responds to command signals generated from the computer 3 to control the activation of each LCD element. These command signals are based on the previously stored information in the computer indicative of the sensed light penetrating the negative or transparency which was detected by image sensors 38 of FIG. 6 and/or otherwise modified by operator input. Driving techniques are well known for driving LCD shutters of flat screen television displays and such techniques are applicable here, except that only a single row of shutters needs to be driven.

For a mechanical shutter, each shutter element would be driven by its own motor to open or close or may be spring biased into either the open or closed position. The motor opens or closes the shutter elements in response to drive signals from drive circuitry 41 which is controlled by command signals from the computer 3. These command signals, as mentioned before, are based on the sensed and stored information in the computer obtained from the image sensors 38 or from other forms of input. The shutter elements can either slide into position or be hinged to a support so as to pivot into position when driven by the motor.

FIG. 8 shows a density chart showing values indicative of sensed density of various degrees of light passing through the negative or color transparency, which is representative of the way in which the exposure varies along small sections of the optical image. These are listed in row 34.

These values can range by any amount (e.g. 1 to 10, 1 to 100, etc.) to improve resolution. If the numbers increase with decreasing sensed density (preferably by equal increments), then the number "1" represents the darkest or most dense exposure and so its shutter would remain "open" the longest. All the areas with a number "1" would be exposed first simultaneously (see row 33 and the shutter 40 of FIG. 7).

After a predetermined time interval elapses indicative of the difference in time required for exposing areas of number "1" versus areas of number "2", the shutters over all the number "2" areas are opened.

This process is continued until the area with the greatest numeral value is exposed for its required time. To simplify calculations, the exposure time interval between commencement of exposure is the same for each successively numbered pair of areas. For instance, the exposure time interval between commencement of exposure of areas designated "4" and "5" is the same as that for "5" and "6".

Figure 9:
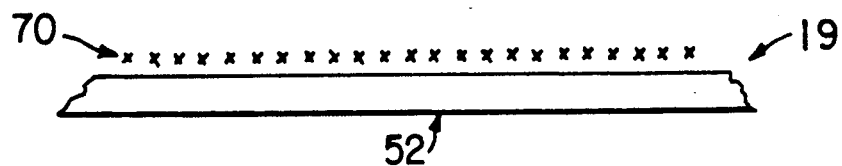
FIG. 9 is a schematic representation of light exposure through a fiber optic bundle.
Figure 10:
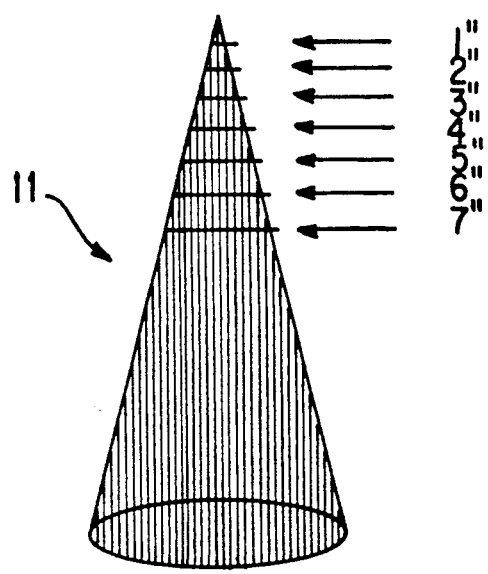
FIG. 10 is an enlarged perspective view of a light acceptance cone of FIG. 9.

FIG. 9 shows a schematic representation of the fiber optic bundles 19 conveying light onto the photosensitive material 52. Light beams 70 leave each of the optic bundles to strike the photosensitive material 52. Each light beam forms an acceptance cone 71 of 68°, which is shown in greater detail in FIG. 10. A cross-section of this cone 71 would have an angle at the apex of the triangle formed of 68°. Common geometric principles as applied to cones can be used to determine the bottom spread of the cone for any given azimuth distance from the apex of the cone, i.e. the further the distance from the apex, the wider the bottom spread.

Figure 11:
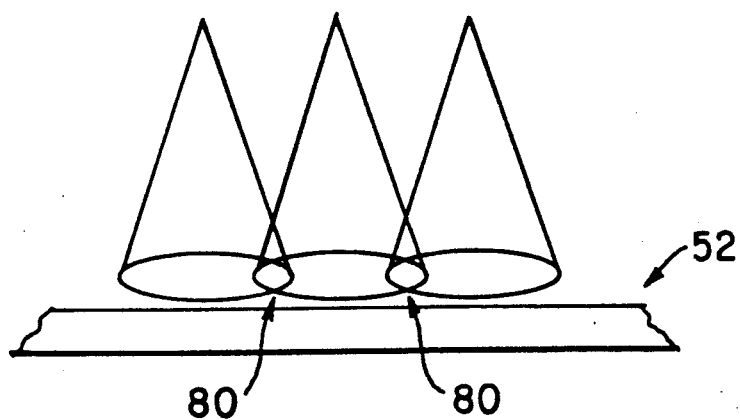
FIG. 11 is a perspective view of multiple light acceptance cones generating an overlap.

FIG. 11 shows a situation to be avoided in which adjacent acceptance cones overlap with each other on the surface of the photosensitive material 52 creating an overlap portion 80. This situation can be avoided by bringing the fiber optic bundle 19 closer to the photosensitive materials so that the bottom spread of the cone for adjacent acceptance cones does not overlap each other.

The transmission specifications of glass fiber optic light is influenced by the bundle diameter, length of the light guide, the number of bends and core to clad ratios. These factors are relatively consistent and there usually is an 8–10% decrease per foot when light is transmitted.

The luminous flux of light emitted from fiber optic bundle 22 must be adjustable. The light beam going through the negative, or transparency, feeds light to optic bundle 19, which exposes the photosensitive material. The brightness range of the beam of light will determine the exposure. If the range is short, less exposure will be necessary. More light will be required to expose an image in a long brightness range. Light intensity through fiber optic source 22 is adjustable by the rheostat 7. Color temperature can be controlled. With 3200° K. color reversal (slide) Tungsten film, a ±200° K. change may not be visually discernable. This will be within acceptable film limits. Exposure times will be short and excellent. Color fidelity can be easily achieved with 3200° K. materials without the influence of ambient light. Extremely long or short exposures result in lower film sensitivity known as, "reciprocity failure", generally caused by bright low and dark high magnifications. To avoid reciprocity failure and maintain color fidelity, the light source must be adjustable to provide adequate illumination and be readjusted with the rheostat at lower magnification to prevent overexposure while maintaining film color temperature requirements. Fiber optics are flicker free, without excessive glare, uneven light distribution or shadows.

Other variations of the preferred embodiment are possible. For instance, instead of moving the mechanical arm 55 in discrete increments horizontally, one small section of the negative can be scanned at a time, from left to right in a manner similar to the scanning method of a cathode ray tube in a television. The CCD array scans the image in a regular manner and converts the charge pattern into an electronic signal. The information about the degree of density is sent to the receiving end of the computer where it is used to build up a reproduction of the original image. The computer is programmed to correct the exposure. The information is stored.

An alternative method of employing fiber optics to expose photosensitive materials would be to incorporate a masking system, microscopic lenses, and a light source together in the enlarger head. Small sections are exposed "randomly" if each optic strand had a lens attached to it. The lenses prevent light spread. This method would still require a masking system, CCD array, light source, and computer system.

Another alternative is to dispense with fiber optic bundle 19 and arrange the shutter masking system between fiber optic bundle 22 and the condensers in the enlarger head 1. A mechanical arm 55 could still be employed for sensing the density or color variations in the negative or transparency by employing image sensors. The sensed information is stored in memory and used to control the shutter system in the enlarger head to expose each segment in each line to the proper time exposure in accordance with the sensed information, in as manner similar to the preferred embodiment.

Although a mechanical arm has been described as the preferred embodiment for holding image sensors, the image sensors could also be spread across a plate of the same size as the photosensitive paper or may be a single image sensor movable across the entire area of the photosensitive paper, or an xy Table with stepper motors.

The image sensors could also be removably inserted directly beneath the negative in the enlarger.

While the foregoing description and drawings represent the preferred embodiments of the present invention, it will be understood that various changes and modifications may be made without departing from the spirit and scope of the present invention.

What is claimed is:

1. An apparatus for exposing light sensitive materials, comprising:
   means for emitting light from a single light source along a path through a light transmissible element to the light sensitive materials;
   a plurality of light guides in said path;
   shutter means in said path for selectively and individually blocking the light from exposing said light sensitive materials from each of said light guides, said shutter means including a plurality of shutter elements in registry with said plurality of light guides, respectively; and
   a movable arm supporting said light guides and said sensing means, said arm being movable for sweeping between the light sensitive materials and the light transmissible element.

2. An apparatus as defined in claim 1, wherein said shutter means selectively opens and closes in registry with each of said light guides, said shutter means opening to allow the passage of light through said shutter means and closing to block the light from passing through said shutter means.

3. An apparatus as defined in claim 1, wherein said light guides are fiber optic elements.

4. An apparatus as defined in claim 1, wherein said light guides each have an end arranged so that the light leaving through said end of each of said light guides that exposes does not overlap the light when the light strikes the light sensitive materials.

5. An apparatus as defined in claim 1, wherein said plurality of light guides includes at least 300 of said light guides per linear inch.

6. An apparatus as defined in claim 1, further comprising means for sensing a characteristic property of the light transmissible element.

7. An apparatus as defined in claim 1, further comprising means for sensing at least one of density and color variations in the light transmissible element.

8. An apparatus as defined in claim 1, further comprising:
 easel means having a light-tight drawer for containing the light sensitive materials, said drawer having slots arranged in accordance with accommodating different sizes of said the light sensitive materials, said drawer having an opening in which is fitted said arm, said arm being movable across said drawer for exposing the light sensitive materials within said drawer to light one line at a time through said arm.

9. An apparatus as defined in claim 7, further comprising computer means responsive to said sensing means for storing information indicative of said characteristic property of the light transmissible element as sensed by said sensing means, and means responsive to said computer means for driving said arm in accordance with said information, said shutter means being responsive to said computer means for opening and closing in accordance with said information.

10. An apparatus as defined in claim 1, wherein said light guides are arranged between the light transmissible element and the light sensitive materials, further comprising a second plurality of light emitting guides arranged between said emitting means and the light transmissible element.

11. An apparatus as defined in claim 9, further comprising means for controlling an intensity of light passing through said second elongated light guides in accordance with said information in said computer means.

12. A method for exposing light sensitive materials, comprising the steps of:
 emitting light from a single light source along a path through a light transmissible element to the light sensitive materials;
 guiding respective portions of the light through each of a plurality of light guides in said path;
 selectively and individually blocking the light from reaching the light sensitive materials at selected locations with shutter elements that are in registry with the light guides, respectively; and
 determining a characteristic property of the light transmissible element, the step of selectively and individually blocking being effected in accordance with the characteristic property determined during the step of determining, the step of determining including sweeping an arm containing light sensitive sensors under the light transmissible element.

13. A method as defined in claim 12, further comprising the step of:
 determining a characteristic property of the light transmissible element, the step of selectively and individually blocking being effected in accordance with the characteristic property determined during step of determining.

14. A method as defined in claim 12, further comprising the step of:
 varying the intensity of light in accordance with the characteristic property determined by the step of determining.

15. A method as defined in claim 12, wherein the step of determining includes determining one of a density and color variations in the light transmissible element.

16. A method as defined in claim 12, wherein the step of conveying includes sweeping the arm over the light sensitive materials, the arm holding the light guides.

17. A method as defined in claim 12, wherein the step of conveying includes positioning the light guides over the light sensitive materials so that light striking the light sensitive materials from adjacent light guides does not overlap.

* * * * *